Figure 1:
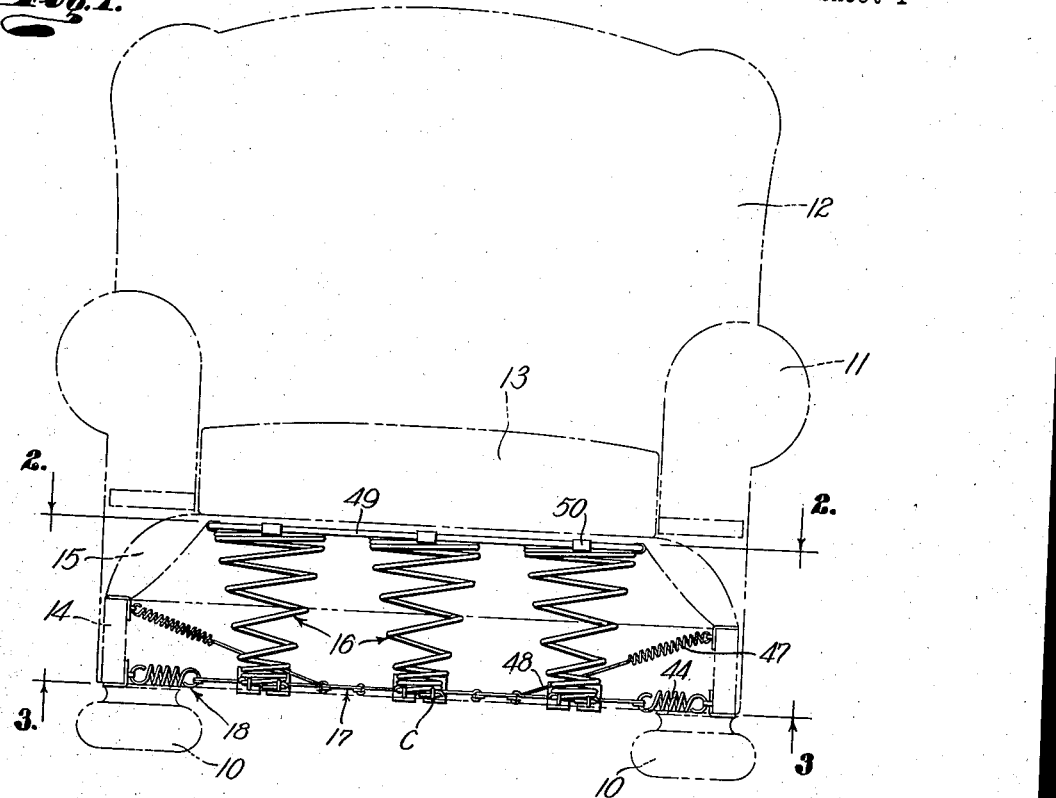

July 15, 1941.    O. A. SMITH    2,249,233
SPRING STRUCTURE
Filed April 27, 1938    2 Sheets-Sheet 1

Inventor
ORRIAN A. SMITH
By
W. H. Capwell
His Attorney

July 15, 1941.
O. A. SMITH
2,249,233
SPRING STRUCTURE
Filed April 27, 1938
2 Sheets-Sheet 2
Fig. 3.
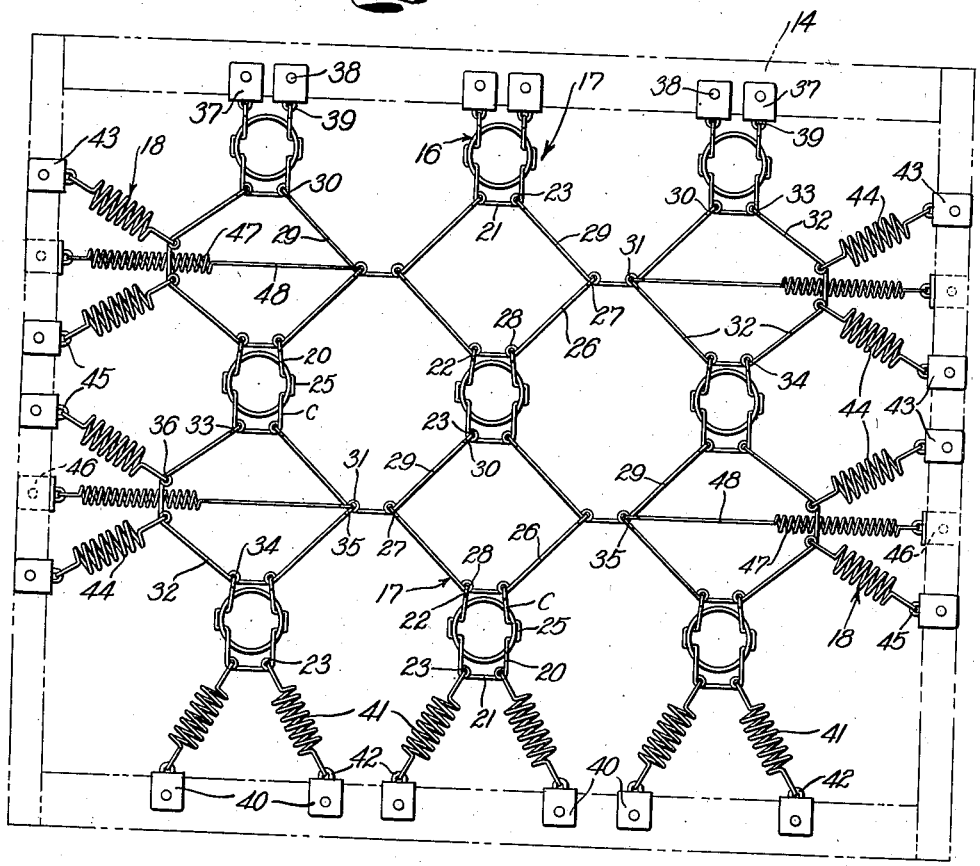
Fig. 4.
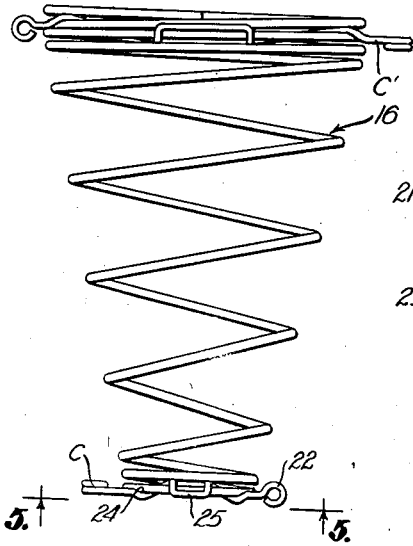
Fig. 6.
Fig. 5.
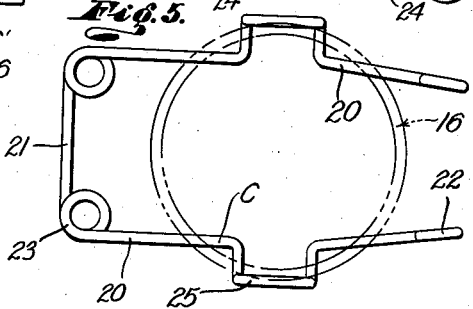
Inventor
ORRIAN A. SMITH
By
Wm H Maxwell
His Attorney Patented July 15, 1941

2,249,233

UNITED STATES PATENT OFFICE 2,249,233

SPRING STRUCTURE

Orrian A. Smith, Los Angeles, Calif.

Application April 27, 1938, Serial No. 204,529

6 Claims. (Cl. 155—179)

This invention relates to spring structures and relates more particularly to upholstery spring constructions. A general object of this invention is to provide a simple, practical and very durable spring structure for upholstered furniture, etc.

The spring structures or spring assemblies provided in the seats and backs of chairs, sofas, etc., have a tendency to sag after a short period of use. Various forms of webbings, bands and supports have been suggested and employed to tie the springs of such structures to prevent the undesirable sagging, but have not proved satisfactory or have proven too costly.

Another object of this invention is to provide a means for supporting the springs of an upholstery spring assembly that prevents sagging of the assembly and the associated upholstery unit.

Another object of this invention is to provide a spring assembly or structure for upholstered furniture that is durable and that will not sag after extended use.

Another object of this invention is to provide a spring structure of the character mentioned that is silent and that does not squeak, rattle or make other sounds when the article of furniture is in use.

Another object of this invention is to provide a spring structure of the character mentioned in which the individual springs are dependably held against horizontal as well as vertical shifting and displacement.

Another object of this invention is to provide an assembly or structure of the character mentioned in which the spring connecting and supporting means is such that it contracts in one direction and stretches or expands in the opposite direction when a weight is imposed on the structure and the contraction is resisted by an effective spring means whose resistance prevents excessive stretching or sagging of the supporting means.

Another object of this invention is to provide a spring structure of the character mentioned in which the various elements of the main spring connecting and supporting means are interlocked and are secured to the main springs in such a manner that they cannot become separated or detached from the assembly.

A further object of this invention is to provide a spring assembly of the character mentioned that is simple and inexpensive and that does not embody special steel bands, straps, or like elements.

Figure 2:
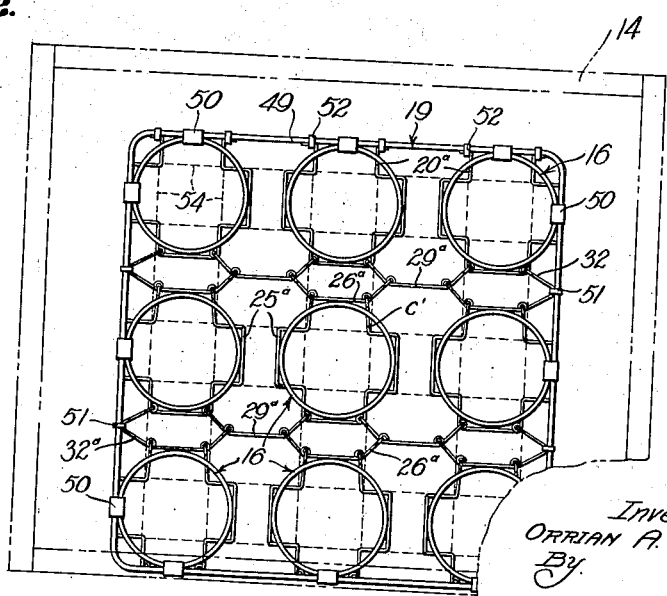

The various objects and features of my invention will be fully understood from the following detailed description of a typical preferred form and application of my invention, throughout which description reference is made to the accompanying drawings, in which:

Fig. 1 is a front elevation of a typical chair embodying a seat spring structure of the character provided by this invention, showing the chair parts in broken lines. Fig. 2 is a top or plan view of the spring structure showing the supporting frame in broken lines and omitting the elements of the lower part of the structure taken as indicated by line 2—2 on Fig. 1. Fig. 3 is an enlarged bottom view of the spring structure showing the supporting frame in broken lines and omitting the upper parts of the structure taken as indicated by line 3—3 on Fig. 1. Fig. 4 is an enlarged side elevation of one of the main springs removed from the assembly with the upper and lower clips connected thereto. Fig. 5 is an enlarged bottom view taken as indicated by line 5—5 on Fig. 4 showing the lower convolution of the spring in broken lines and Fig. 6 is a side or edge view of the clip shown in Fig. 5.

The spring assembly or spring structure of the present invention is capable of embodiment in forms for use in upholstered furniture and other articles of various natures. In the following detailed description I will describe a simple preferred form of the invention as employed or embodied in a typical chair, it being understood that the invention is not to be construed as limited or restricted to the specific form or application about to be described.

In order to simplify the drawings I have illustrated the furniture article or chair in broken lines. The parts of the chair shown in the drawings are the legs or feet 10, the arms 11, the back 12, the seat cushion 13 and the supporting frame 14 for the seat spring structure. The arms 11 and the back 12 may be considered as upholstered and it may be assumed that the back 12 is provided with a spring structure of the character provided by the invention. The frame 14 is a rectangular structure built in or fixed in the general chair frame. The frame 14 may be considered as constructed of wood. Fabric 15 carrying upholstering material or padding is secured to the frame 14 and covers the spring structure of the seat.

The improved spring structure of the present invention may be said to comprise, generally, a plurality of springs 16, means 17 tying together the lower ends of the springs 16, means 18 connecting the said means 17 with the frame 14 to support the structure, and means 19 tying together and maintaining the upper ends of the springs 16 in the desired relationship.

The springs 16 which may be considered the principal or main springs of the structure, are preferably alike in size and shape. In the typical case illustrated the springs 16 are so-called conical springs being coiled wire springs tapering from one end to the other. The springs 16 are arranged in upright or vertical positions and have their large ends facing upwardly and their small ends facing downwardly. While it is not essential it is preferred to construct the springs 16 so that their upper convolutions are in close relation or in contact, and so that their lower convolutions are in close relation or in contact. Springs 16 of this construction are illustrated in the drawings.

In accordance with the invention the springs 16 are arranged in spaced relation and are aligned in rows. Where the supporting frame 14 is rectangular or square, as illustrated, the springs 16 are arranged in rows extending both forwardly and rearwardly and transversely of the seat frame to constitute an assembly that is substantially square or rectangular in plan view. The number of springs 16 employed in the structure of course varies in different applications of the invention. In the particular case illustrated there are nine springs 16 arranged in three forwardly and rearwardly extending rows and three transverse rows.

The means 17 is an important feature of the invention. The means 17 is provided to connect the lower ends of the springs 16 for suspension or mounting in the frame 14 through the medium of the means 18 and the means 17 serves to normally maintain the springs in a common horizontal plane and to prevent shifting and displacement of the lower ends of the springs.

The means 17 includes a member or clip C applied to the lower end of each spring 16. The clips C are preferably identical to promote economy in the manufacture and assembly of the structure. Each clip C is formed of a single length of stock or wire. The clips C are generally U-shaped in plan view each having two spaced side arms 20 and an end or transverse part 21. As initially constructed the clips C have their side arms 20 flaring or diverging from their points of connection with the transverse parts 21. However, when the clips are in the operative position on the springs 16 their arms 20 are substantially parallel. The free or outer end portions of the clip arms 20 may be outwardly convergent as best illustrated in Fig. 5. An eye or hook 22 is formed on the outer end of each clip arm 20. The hooks 22 may be formed by bending the wire of the clips C and are preferably shaped to lie in vertical planes and to present horizontal openings. The clips C have eyes 23 at the points of connection of their arms 20 with their transverse parts 21. The eyes 23 preferably lie in horizontal planes and present vertical openings. As best illustrated in Fig. 6 of the drawings the centers of the hooks 22 and the eyes 23 lie in common horizontal planes. The eyes 23 may be formed by bending or helically coiling the wire of the clips C and this shaping or bending of the clips gives them considerable resiliency. The flexibility and resiliency given the clips by their eyes 23 resist movement of the arms 20 toward one another and normally urge the arms 20 outwardly when they are maintained in substantially parallel relation.

The arms 20 of the clips C are so shaped that each has two longitudinally spaced downwardly directed bends which I will term depressions 24. The material of the arms 20 between the spaced depressions 24 is bent outwardly and then downwardly to provide lateral tabs or saddles 25. The saddles 25 project outwardly or laterally from the arms 20 and their outer parts project downwardly to lie in substantially the same planes as the straight portions of the arms 20. The downward bending of the outer parts of the saddles 25 provides downwardly facing bends or depressions in the saddles.

The clips C are applied to or connected with the lower parts of the springs 16 to occupy corresponding positions in the assembly. The clips C are assembled on the springs 16 to have their arms 20 and saddles 25 cooperate with the lower convolutions of the springs. In applying a clip C to a spring 16 the outer ends of the arms 20 are pressed toward one another to reduce the width of the clip whereupon the saddles 25 may be introduced into the lower end of the spring. The arms 20 may then be released and the clip C manipulated to make the saddles 25 engage over the lower spring convolution. The tabs or saddles 25 engage over the lower spring convolution at diametrically opposite points and the depressions 24 in the arms 20 receive the lower convolution and cooperate with its under surface. It will be noted that the clips C provided with saddles 25 and the depressions 24 have their side parts in meshing or woven relation to the lower convolutions of the springs 16. The cooperation of the depressions 24 with the spring convolutions steadies the clips and assists in preventing shifting of the clips relative to the springs. The cooperation of the saddles 25 with the spring convolutions maintains the depressions 24 in cooperation with the convolutions and thus prevents relative vertical movement between the springs and the clips. The saddles 25 engage the convolutions of the springs 16 to assist in preventing lateral or horizontal relative movement between the clips and the springs.

Following the application of the clips C to the springs 16 they are preferably turned to thread or advance them some distance up in the springs. Where the lower convolutions of the springs 16 are close together, as described above, the saddles 25 or the adjacent parts of the clip arms 20 are gripped between the adjacent convolutions so that there can be no play and, therefore, no rattling of the parts when the structure is in operation. The resiliency of the clips C augmented by their eyes 23 assists in maintaining the clips C in firm cooperation with their respective springs 16 to prevent the development of sound and to prevent play and shifting. The reception of the spring convolutions in the depressions 24 and in the saddles 25 provides for the arrangement of the hooks 22 and the eyes 23 in the same horizontal planes as the engaged or adjacent convolutions of the springs. In the preferred construction illustrated in the drawings the clips C are correspondingly positioned so that their open sides face forwardly or toward the front of the seat frame 14 and the arms 20 of the clips are substantially parallel with the side members of the frame. It will be observed that the clips C are simple, inexpensive members and are easily attached to the springs 16.

The means 17 further includes link elements for connecting or tying together the clips C of the several springs 16. The hooks 22 of the clips C on the central forwardly and rearwardly extending row of springs 16 receive tie members or links 26. The links 26 are constructed of wire and are shaped to each pass through the two hooks 22 of a clip C and then extend forwardly and laterally from the hooks. The forward ends of the links 26 have suitable eyes or hooks 27. In the preferred construction the links 26 have bends or eyes 28 receiving or cooperating with the hooks 22 of the clips C on the inner forwardly and rearwardly extending row of springs 16. Links 29 are connected with the eyes 23 of the clips C on the central forwardly and rearwardly extending row of springs 16 and extend rearwardly and laterally and then forwardly and laterally to connect with the eyes 23 of the clips C on the adjacent or aligned outer rows of springs 16. The links 29 may be identical with the links 26. The links 29 have hooks or eyes 30 cooperating with the eyes 23 of the clips C and have spaced intermediate eyes 31. The eyes or hooks 27 on the ends of the links 26 cooperate with the eyes 31 of the adjacent links 29. It is believed that it will be apparent how the links 26 and the links 29 connect the clips C of the central forwardly and rearwardly extending row of springs 16 with the clips C on the side rows of the springs.

The means 17 further includes ties or links 32 connected with the clips C on the side rows of springs 16. The links 32 have eyes or hooks 33 linked with the outer eyes 23 of the clips C on the side rows of springs S. The links 32 extend outwardly and rearwardly from the hooks 33 then rearwardly in parallel relation with the side parts of the frame 14 and then rearwardly and inwardly for cooperation with the pairs of hooks 22 of the adjacent clips C. The links 32 preferably have bends or eyes 34 for receiving or cooperating with the hooks 22. The links 32 extend forwardly and inwardly from their innermost eyes 34 and their inner ends have suitable hooks 35 cooperating with eyes 31 of the adjacent links 29. It will be seen how the links 32 serve to connect the adjacent clips C of the side rows or springs 16 and how they assist in connecting the clips C of the side rows of springs with the clips C of the central row of springs. Each link 32 preferably has two spaced eyes 36 formed in its outermost portion. It will be observed that the hooks 22 of the clips C associated with the forward row of springs 16 are not engaged by links and that the eyes 23 of the clips C on the rear row of springs 16 are likewise free of links. The cooperating eyes and hooks of the clips C and the links 26, 29 and 32 are such that the assembly of the clips and links may work or give under a weight applied to the spring structure without subjecting any of the parts to bending strains. It is to be observed that the interconnected links are in diagonal relation to one another.

The means 18 for suspending or securing the assembly in the frame 14 serves to pivotally connect the clips C of the forward row of springs 16 with the frame 14 and to yieldingly and resiliently connect the clips C of the side and rear rows of springs with the adjacent frame parts. The means 18 includes suitable clips or brackets 37 on the forward member or part of the frame 14. The brackets 37 may be angle-shaped or L-shaped and may be secured to the frame 14 by screws or nails 38. Staples or eyes 39 on the brackets 37 receive the hooks 22 of the clips C on the forward row of springs 16. The cooperation of the hooks 22 with the eyes 39 is such that the clips C may pivot or swing with respect to the brackets 37 and the frame 14. It is to be noted that the spring structure is connected with the front of the frame 14 in such a manner that it cannot shift or work rearwardly in the frame.

The means 18 further includes brackets 40 similar to the brackets 37 attached to the rear member or part of the frame 14. Helical springs 41 are hooked to or connected with the eyes 42 of the brackets 40 and have their forward ends received or hooked in the eyes 23 of the clips C on the rear row of springs 16. The brackets 40 are related to the clips C in such a manner that the springs 41 are in forwardly convergent relation as clearly illustrated in Fig. 3 of the drawings. Brackets 43 similar to the brackets 37 are secured to the side members or parts of the frame 14. The means 18 includes helical springs 44 having their ends hooked to the eyes 45 of the brackets 43 and hooked with the eyes 36 of the adjacent links 32. The springs 44 are arranged in pairs and the springs of each pair are in inwardly convergent relation. The springs 41 and 44 are normally under tension and are of sufficient strength to normally hold the spring structure in the desired position and to resist sagging and distortion of the structure. The supporting or securing brackets 37, 40 and 43 are preferably connected with the lower parts of the supporting frame 14.

Spring means may be provided to assist in preventing sagging of the inner or central portion of the structure, particularly where the structure is of substantial length or width. This means includes brackets 46 secured to the side parts of the frame 14. The brackets 46 are preferably attached to the upper portion of the frame 14. Helical springs 47 are connected with the brackets 46 and their inner ends have extensions 48 hooked or linked through the eyes 31 of aligned or adjacent links 29. The inner ends of the springs 47 are connected with the link structure at points between the side rows of springs 16 and the inner row of springs 16. The springs 47 slope downwardly and inwardly and materially assist in preventing sagging of the inner or central portion of the structure.

The means 19 for tying together the upper ends of the springs 16 is similar, generally, to the above-described means 17. The means 19 includes a marginal frame 49 formed of heavy wire or rod stock. The frame 49 is substantially square or rectangular and is proportioned so that its several side parts are adjacent the convolutions of the marginal springs 16 of the assembly. The upper convolutions of the springs 16 in the side, front and rear rows of springs may be connected with the frame 19 by suitable clips 50. The clips 50 are preferably such that they allow relative working or pivoting of the springs 16 relative to the frame 19.

The means 19 further includes clips $C^1$ on the upper ends of the springs 16, links $26^a$, links $29^a$ and links $32^a$. The clips $C^1$ and the links $26^a$ and $29^a$ are similar in construction and operation to the corresponding clips C and links 26 and 29 of the means 17 described in detail above. The clips $C^1$ and the links $26^a$ and $29^a$ differ from the corresponding clips C and links 26 and 29 to adapt them for use on the large upper ends of the conical springs 16. The links $32^a$ are similar to the links 32 except that their outer parts are shaped to be effectively connected with the frame 49 by ring-like clips 51. As clearly illustrated in Fig. 2 of the drawings the clips 50 may serve to connect the saddles 25ᵃ of the adjacent clips C¹, on the side rows of springs 16, with the frame 49. The arms 28ᵃ of the clips C¹ on the forward row of springs 16 may have their forward ends bent laterally to be connected with the frame 49 by suitable bands 52. It may be found desirable or necessary to thread or train wire or twine 54 through the parts of the means 19 and the upper ends of the springs 16 to close or reduce the size of the openings in the upper ends of the springs. I have illustrated the wires or twine 54 in broken lines to better distinguish them from the other elements of the assembly. The operation of the several clip and link parts of the means 19 is the same as that of the corresponding elements of the above-described means 17.

It is believed that the utility and practicability of the spring structure provided by this invention will be readily apparent from the foregoing detailed description. The clips C together with the associated links 26, 29 and 32 serve to dependably tie together the lower ends of the several springs 16 to prevent shifting and displacement of the springs. The helical springs 41, 44 and 47 of the means 18 support the side and rear parts of the spring structure in the frame 14 in such a manner that the structure has the desired resiliency. The bias or diagonal relationship between the links 26, 29 and 32 is such that the structure may tend to sag or bow downwardly under weight to be increased in length from the front to the back and the connections between the several parts are such that this extension or expansion is accomplished without subjecting any of the parts to bending or breaking forces. However, when the assembly of the means 17 is distorted or extended as just described it contracts from its sides and this contraction is resisted by the springs 44 and in some degree by the springs 47. Accordingly, elongation or extension of the link and clip assembly by an applied weight is resisted by the resilient springs 44 and 47 and can never be excessive. The springs 44 and 47 of course serve to return or assist in returning the spring assembly to its original position and condition when the weight is removed. The clips C, the links 26, 29 and 32, are all simple inexpensive parts formed of wire and are easily and quickly assembled. The structure does not involve any special expensive parts of spring steel or the like.

The diagonal relationship between the several links of the means 17 and the means 19 is such that the assembly may be increased in width and decreased in breadth, or vice-versa, to proportion or shape it for attachment to supporting frames 14 and marginal frames 49 of different sizes, etc. This feature is important as it permits the variation in the spacing of the main springs 16 and variation in the dimensions of the structure to adapt it for use in numerous situations.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. In a spring structure of the character described, a spring having end convolutions, and a wire clip comprising a transverse portion, spaced arms projecting from the ends of the transverse portion in substantially parallel relation and engaging against one side of a convolution of the spring, and parts on the arms between their ends projecting laterally from the arms with respect to the longitudinal axis of the spring engaging against the opposite side of the said convolution, the arms being manually flexible toward one another to allow said parts to be entered in the spring so that said parts may be engaged against said opposite side of said convolution.

2. In a spring structure, a coiled spring, and a wire clip including two spaced arms to engage one side of a convolution of the spring, a transverse part connecting the arms, parts on the arms projecting axially therefrom with respect to the longitudinal axis of the spring to enter said convolution, and laterally projecting saddles on the last named parts to engage the other side of the said convolution, said transverse part and the arms being flexible whereby the arms may be sprung toward one another to provide for the introduction of the saddles to the said convolution.

3. In a spring structure, a coiled spring, and a generally U-shaped wire clip comprising two spaced arms each engageable with one side of a convolution of the spring at spaced points, parts on each arm between said points extending axially with respect to the longitudinal axis of the spring to enter said convolution, saddles projecting laterally from said parts to engage against the other side of said convolution and bent to have depressions receiving said convolution, and a transverse portion connecting said arms, the arms being adapted to be sprung toward one another to permit the introduction of said parts and saddles to said convolution.

4. In a spring structure for attachment to a support and adapted to carry a plurality of spaced springs, the combination of members connected with corresponding ends of the springs, and a link assembly connecting the members, the link assembly comprising a plurality of links, each link having only two divergent arms and a transverse portion connecting the arms, one end of each arm being connected with a member and one end of each arm being pivotally connected to an end of an arm of another of said links, the several links being faced in the same direction and arranged with their said arms in diagonal relation and with their transverse portions substantially parallel, and means for anchoring the link assembly to the support.

5. In a spring assembly having a plurality of spaced springs with clips on corresponding ends of the springs, the combination of a link assembly connecting the several springs comprising a plurality of inner links occupying positions between opposite sides of the assembly, and side links at opposite sides of the assembly, each link comprising an intermediate portion and arms diverging from the opposite ends of said portion, said links facing in the same direction so that their arms are in diagonal relation, one end of each arm of said inner links being connected to a clip and one end of each arm of said inner links being pivotally connected with an end of an arm of another link so that the interconnected links and clips define a plurality of substantially diamond shaped spaces, one arm of each of said side links having an end pivotally connected with a clip and an end pivotally connected with an end of an arm of an inner link, the other arms of said side links each having an end pivotally connected with a clip, and extensions on the other ends of said other arms each pivotally connected with a clip to complete said spaces at the sides of the assembly.

6. In a spring assembly having a plurality of rows of spaced springs with clips on corresponding ends of the springs, a link assembly connecting the several springs comprising a plurality of inner links occupying positions between opposite sides of the assembly and side links at opposite sides of the assembly, each link including an intermediate portion, arms diverging from the opposite ends of said portion, and eyes at opposite ends of each arm, said links facing in the same direction so that their arms are in diagonal relation and their intermediate portions are substantially parallel, one eye of each arm of an inner link being linked to a clip and one eye of each arm of an inner link being linked with an eye of an arm of another link, one arm of each side link having one of its eyes linked with an eye of one of the arms of an inner link and having its other eye linked with a clip, the other arms of the side links each having an eye linked with a clip, and extensions on said other arms having eyes linked with adjacent clips.

ORRIAN A. SMITH.